US012541489B2

(12) United States Patent
Jain et al.

(10) Patent No.: US 12,541,489 B2
(45) Date of Patent: Feb. 3, 2026

(54) DATA DEFINITIONS AND MAPPINGS FOR SEAMLESS DATA IMPORT

(71) Applicant: Oracle International Corporation, Redwood Shores, CA (US)

(72) Inventors: Nilesh Suresh Jain, Sterling, VA (US); Greg Dimock, Lane Buffalo, NY (US); Carsten R. Dreesbach, Alexandria, VA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/769,124

(22) Filed: Jul. 10, 2024

(65) Prior Publication Data

US 2025/0077484 A1 Mar. 6, 2025

Related U.S. Application Data

(60) Provisional application No. 63/579,774, filed on Aug. 30, 2023.

(51) Int. Cl.
G06F 16/21 (2019.01)
G06F 16/25 (2019.01)

(52) U.S. Cl.
CPC .......... G06F 16/213 (2019.01); G06F 16/254 (2019.01)

(58) Field of Classification Search
CPC ............................ G06F 16/213; G06F 16/254
See application file for complete search history.

(56) References Cited

U.S. PATENT DOCUMENTS

2018/0218052 A1* 8/2018 Cosgrove, Jr. ........ G06F 16/254
2019/0050480 A1* 2/2019 Courter ............. G06F 16/24522

* cited by examiner

Primary Examiner — Jay A Morrison
(74) Attorney, Agent, or Firm — Invoke

(57) ABSTRACT

Techniques for ingesting data using an attribute definition file are disclosed. The system receives an attribute definition file that defines an attribute name, an entity type, and one or more validation criteria for an attribute. The system receives a dataset comprising a plurality of attribute values with a respective plurality of attribute names. The system determines whether an attribute name in the dataset maps to an attribute name in the definition file and maps the attribute value in the dataset to the attribute definition of the attribute. The system then determines whether the attribute value meets the validation criteria in the definition and stores the attribute value in a data repository when the value meets the validation criteria.

24 Claims, 8 Drawing Sheets

DATA DEFINITIONS AND MAPPINGS FOR SEAMLESS DATA IMPORT

INCORPORATION BY REFERENCE; DISCLAIMER

Each of the following applications are hereby incorporated by reference: Application 63/579,774, filed Aug. 30, 2023. The applicant hereby rescinds any disclaimer of claims scope in the parent application(s) or the prosecution history thereof and advises the USPTO that the claims in the application may be broader than any claim in the parent application(s).

TECHNICAL FIELD

The present disclosure relates to ingesting data using an attribute definition file.

BACKGROUND

A service provider may receive data from an entity, such as a utility company or from a customer of the utility company. The service provider may provide services related to the received data, such as analysis of usage patterns and/or suggestions for optimization. If the entity wishes to modify an aspect of the data that the entity sends or wishes to add another type of data to the data the entity sends, the service provider may need time to modify or update their data storage and retrieval system to accommodate the change.

A service provider may also receive data from multiple entities. The data from one entity may be defined and/or formatted one way, while the data from another entity may be defined and/or formatted in another way. Datasets from different entities may correspond to different schemas. Some of the data from one entity may represent the same type of data as from the other entity.

The approaches described in this section are approaches that could be pursued, but not necessarily approaches that have been previously conceived or pursued. Therefore, unless otherwise indicated, one should not assume that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. References to "an" or "one" embodiment in this disclosure are not necessarily to the same embodiment, and they mean at least one. In the drawings.

DETAILED DESCRIPTION

Figure 1:
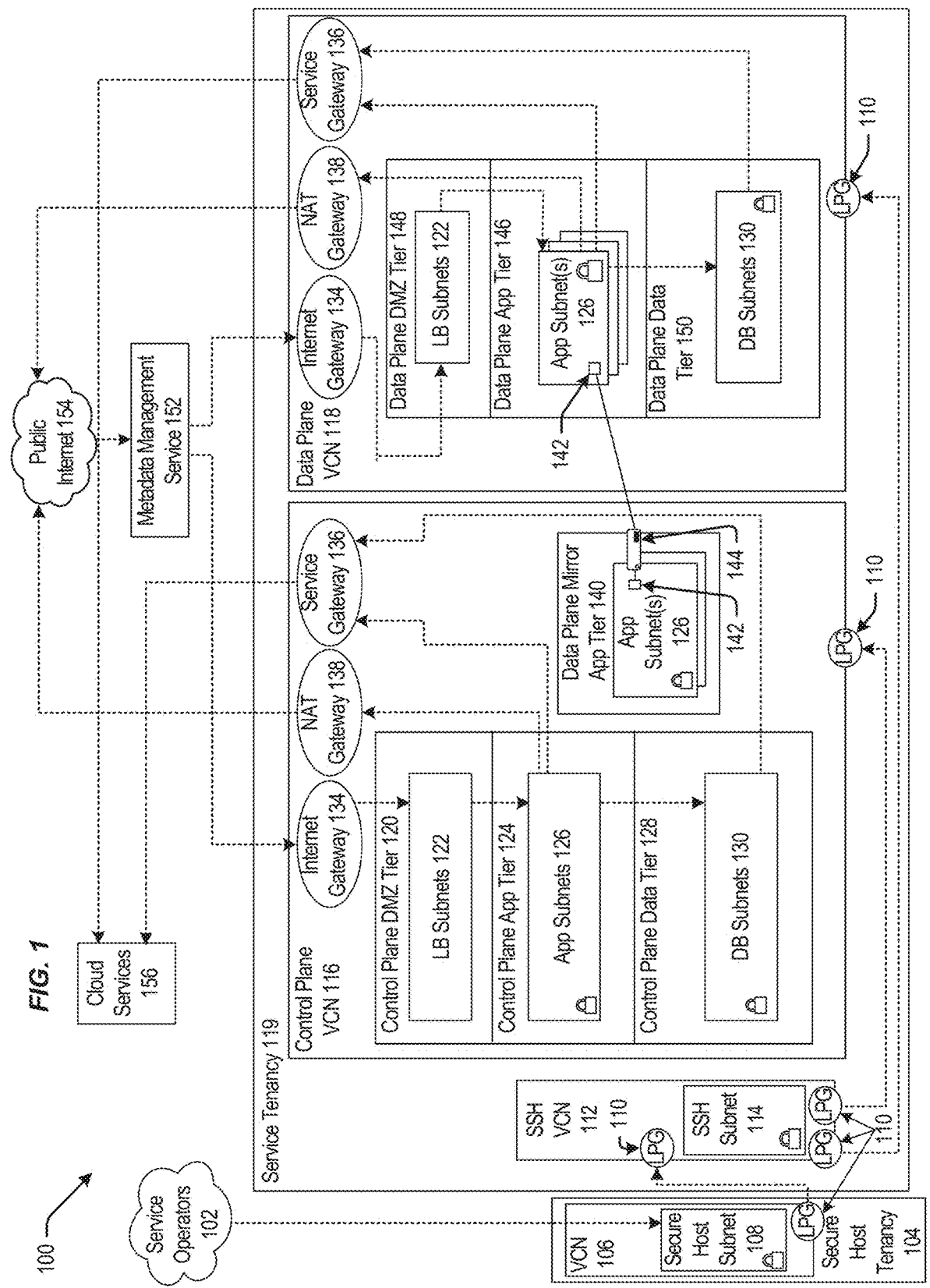
FIGS. 1-4 are block diagrams illustrating patterns for implementing a cloud infrastructure as a service system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. General Overview
2. Cloud Computing Technology
3. Computer System
4. Data Ingestion System
5. Receiving, Validating, and Storing Data
6. Example Embodiment
7. Practical Applications, Advantages, and Improvements
8. Miscellaneous; Extensions

General Overview

One or more embodiments ingest data using an attribute definition file to validate the data. The use of the attribute definition file enables the ingestion of any dataset with any schema, regardless of whether the schema has been defined for a data repository where the dataset is to be stored.

An attribute definition file defines a set of keys. Each key in the attribute definition file has a defined attribute name, entity type, and one or more validation criteria. The system receives both the attribute definition file and the dataset to be ingested. The attribute definition file may be received at the same time or at a different time than the dataset to be ingested. The dataset includes attribute-value pairs. Each attribute-value pair includes a value for the attribute that is associated with the attribute name. The system validates each attribute-value pair based on validation criteria in the attribute definition file. Validation includes mapping the attribute-value pair, based on the attribute, to a particular attribute definition in the attribute definition file. The mapping may further be based on an entity type associated with the attribute in the received dataset. The system identifies a validation criterion corresponding to the attribute definition that is mapped to the attribute-value pair. Thereafter, the system attempts to validate the value based on the attribute definition. If the value is successfully validated based on the attribute definition, the system stores the value. If the value is not successfully validated based on the attribute definition, the system discards the value and/or presents a notification based on the failed validation. Storing the value may include storing the attribute-value pair as received in the dataset. Alternatively, or additionally, storing the value may include mapping the attribute, as received in the dataset, to a known attribute associated with a data repository. The value, from the attribute-value pair, is stored in data repository in association with the known attribute-value pair.

One or more embodiments described in this Specification and/or recited in the claims may not be included in this General Overview section.

Cloud Computing Technology

Infrastructure as a Service (IaaS) is an application of cloud computing technology. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components; example services include billing software, monitoring software, logging software, load balancing software, clustering software, etc. Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and install enterprise software into that VM. Customers can then use the provider's services to perform various functions, including balancing network traffic, troubleshooting application issues, monitoring performance, and managing disaster recovery, etc.

In some cases, a cloud computing model will involve the participation of a cloud provider. The cloud provider may, but need not, be a third-party service that specializes in providing (e.g., offering, renting, selling) IaaS. An entity may also opt to deploy a private cloud, becoming a provider of infrastructure services.

In some examples, IaaS deployment is the process of implementing a new application, or a new version of an application, onto a prepared application server or other similar device. IaaS deployment may also include the process of preparing the server (e.g., installing libraries, daemons, etc.). The deployment process is often managed by the cloud provider below the hypervisor layer (e.g., the servers, storage, network hardware, and virtualization). Thus, the customer may be responsible for handling (OS), middleware, and/or application deployment, such as on self-service virtual machines. The self-service virtual machines can be spun up on demand.

In some examples, IaaS provisioning may refer to acquiring computers or virtual hosts for use, even installing needed libraries or services on them. In most cases, deployment does not include provisioning, and the provisioning may need to be performed first.

In some cases, there are challenges for IaaS provisioning. There is an initial challenge of provisioning the initial set of infrastructure. There is an additional challenge of evolving the existing infrastructure (e.g., adding new services, changing services, removing services, etc.) after the initial provisioning is completed. In some cases, these challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on one another, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up for one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). In some embodiments, infrastructure and resources may be provisioned (manually, and/or using a provisioning tool) prior to deployment of code to be executed on the infrastructure. However, in some examples, the infrastructure that will deploy the code may first be set up. In some instances, the provisioning can be done manually, a provisioning tool may be utilized to provision the resources, and/or deployment tools may be utilized to deploy the code once the infrastructure is provisioned.

FIG. 1 is a block diagram illustrating an example pattern of an IaaS architecture 100 according to at least one embodiment. Service operators 102 can be communicatively coupled to a secure host tenancy 104 that can include a virtual cloud network (VCN) 106 and a secure host subnet 108. In some examples, the service operators 102 may be using one or more client computing devices, such as portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers, including personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems such as Google Chrome OS. Additionally, or alternatively, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116. The app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively couple to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way; the service gateway 136 can make API calls to cloud services 156, and cloud services 156 can send requested data to the service gateway 136. However, cloud services 156 may not initiate API calls to the service gateway 136.

In some examples, the secure host tenancy 104 can be directly connected to the service tenancy 119. The service tenancy 119 may otherwise be isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118, and the data plane mirror app tier 140 of the control plane VCN 116 can communicate with the data plane app tier 146 of the data plane VCN 118 via VNICs 142 that can be contained in the data plane mirror app tier 140 and the data plane app tier 146.

In some examples, users of the system, or customers, can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configuration to, resources contained in the data plane VCN 118.

In some embodiments, the control plane VCN 116 and the data plane VCN 118 can be contained in the service tenancy 119. In this case, the user, or the customer, of the system may not own or operate either the control plane VCN 116 or the data plane VCN 118. Instead, the IaaS provider may own or operate the control plane VCN 116 and the data plane VCN 118. The control plane VCN 116 and the data plane VCN 118 may be contained in the service tenancy 119. This embodiment can enable isolation of networks that may prevent users or customers from interacting with other users', or other customers', resources. Also, this embodiment may allow users or customers of the system to store databases privately without needing to rely on public Internet 154 for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119. The service tenancy 119 may be isolated from public Internet 154.

Figure 2:
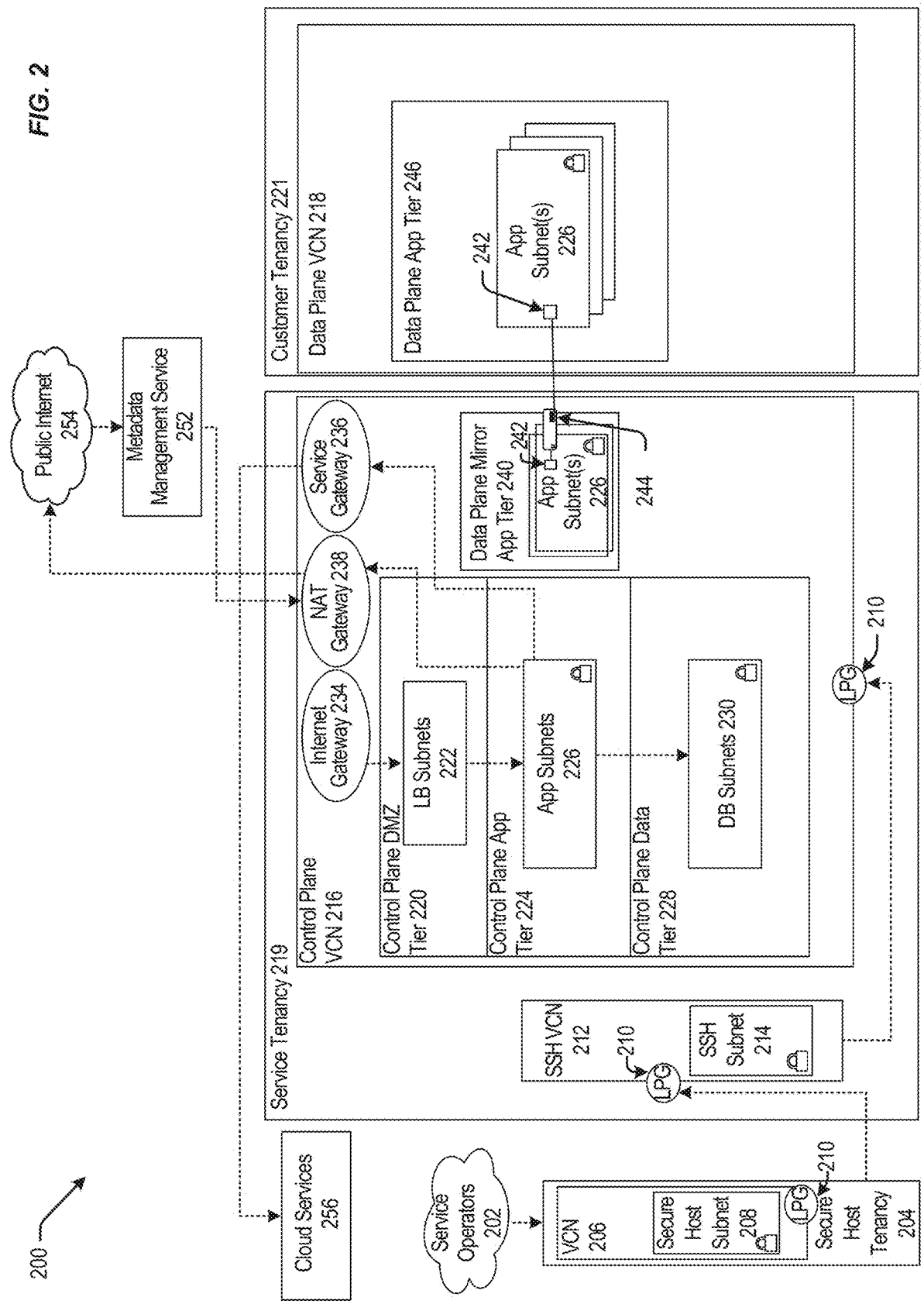

FIG. 2 is a block diagram illustrating another example pattern of an IaaS architecture 200 according to at least one embodiment. Service operators 202 (e.g., service operators 102 of FIG. 1) can be communicatively coupled to a secure host tenancy 204 (e.g., the secure host tenancy 104 of FIG.

1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), and a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216. The app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively couple to cloud services 256 (e.g., cloud services 156 of FIG. 1).

In some examples, the data plane VCN 218 can be contained in the customer tenancy 221. In this case, the IaaS provider may provide the control plane VCN 216 for each customer, and the IaaS provider may, for each customer, set up a unique, compute instance 244 that is contained in the service tenancy 219. Each compute instance 244 may allow communication between the control plane VCN 216 contained in the service tenancy 219 and the data plane VCN 218 that is contained in the customer tenancy 221. The compute instance 244 may allow resources provisioned in the control plane VCN 216 that is contained in the service tenancy 219 to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment or other usage of resources of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Deployment 1" may be located in Region 1 and in "Region 2." If a call to Deployment 1 is made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

Figure 3:
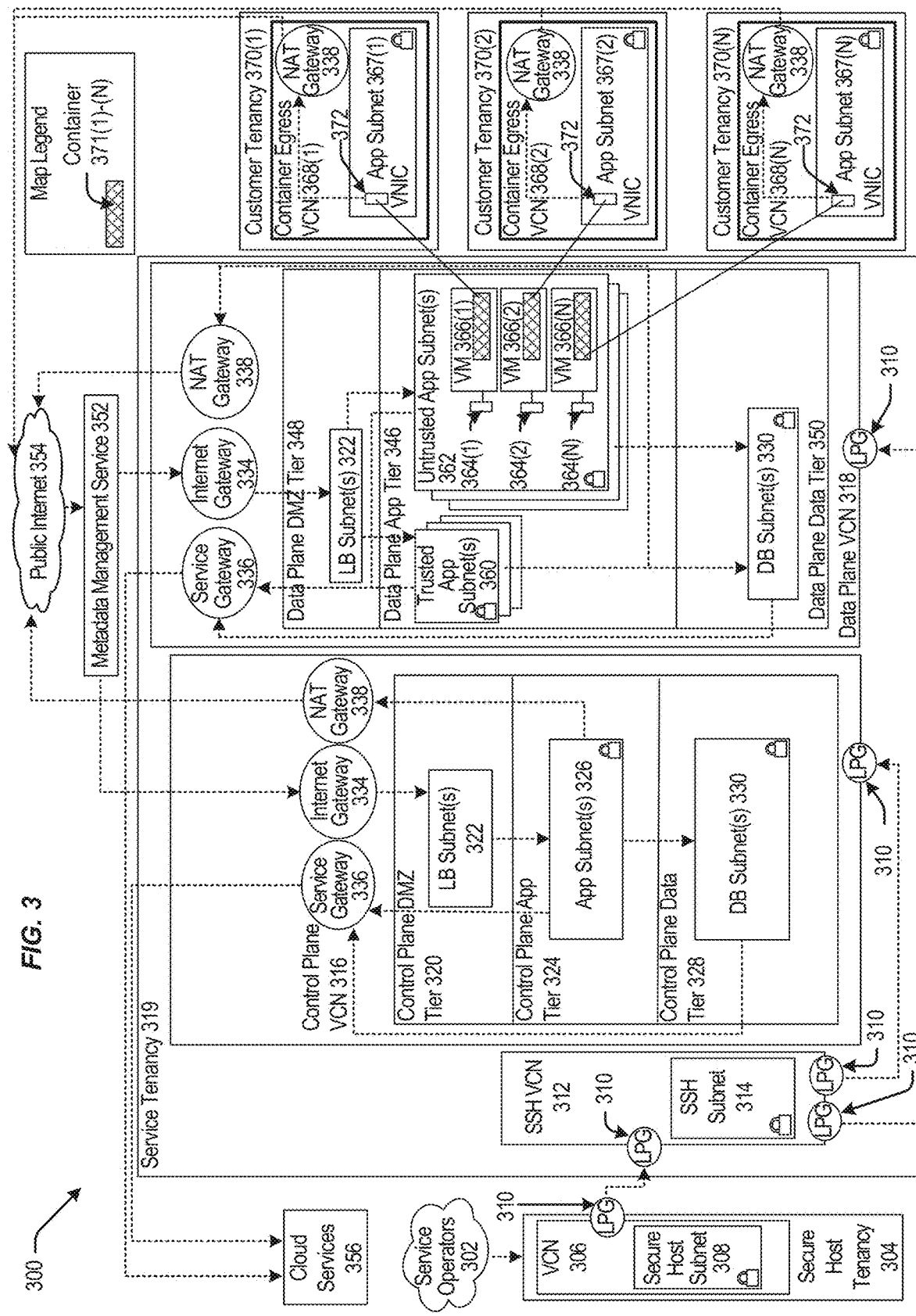

FIG. 3 is a block diagram illustrating another example pattern of an IaaS architecture 300 according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane VCN 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), and a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316, and the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360, untrusted app subnet(s) 362 of the data plane app tier 346, and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Each tenant VM 366(1)-(N) can be communicatively coupled to a respective app subnet 367(1)-(N) that can be contained in respective container egress VCNs 368(1)-(N) that can be contained in respective customer tenancies 380(1)-(N). Respective secondary VNICs 372(1)-(N) can facilitate communication between the untrusted app subnet(s) 362 contained in the data plane VCN 318 and the app subnet contained in the container egress VCNs 368(1)-(N). Each container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management service 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively couple to cloud services 356.

In some embodiments, the data plane VCN 318 can be integrated with customer tenancies 380. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether or not to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. Each VM 366(1)-(N) may be connected to one customer tenancy 380. Respective containers 381(1)-(N) contained in the VMs 366(1)-(N) may be configured to run the code. In this case, there can be a dual isolation (e.g., the containers 381(1)-(N) running code), where the containers 381(1)-(N) may be contained in at least the VM 366(1)-(N) that are contained in the untrusted app subnet(s) 362) that may help prevent incorrect or otherwise undesirable code from damaging the network of the IaaS provider or from damaging a network of a different customer. The containers 381(1)-(N) may be communicatively coupled to the customer tenancy 380 and may be configured to transmit or receive data from the customer tenancy 380. The containers 381(1)-(N) may not be configured to transmit or receive data from any other entity in the data plane VCN 318. Upon completion of running the code, the IaaS provider may kill or otherwise dispose of the containers 381(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 381(1)-(N) that can be contained in the VM 366(1)-(N) of each customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

Figure 4:
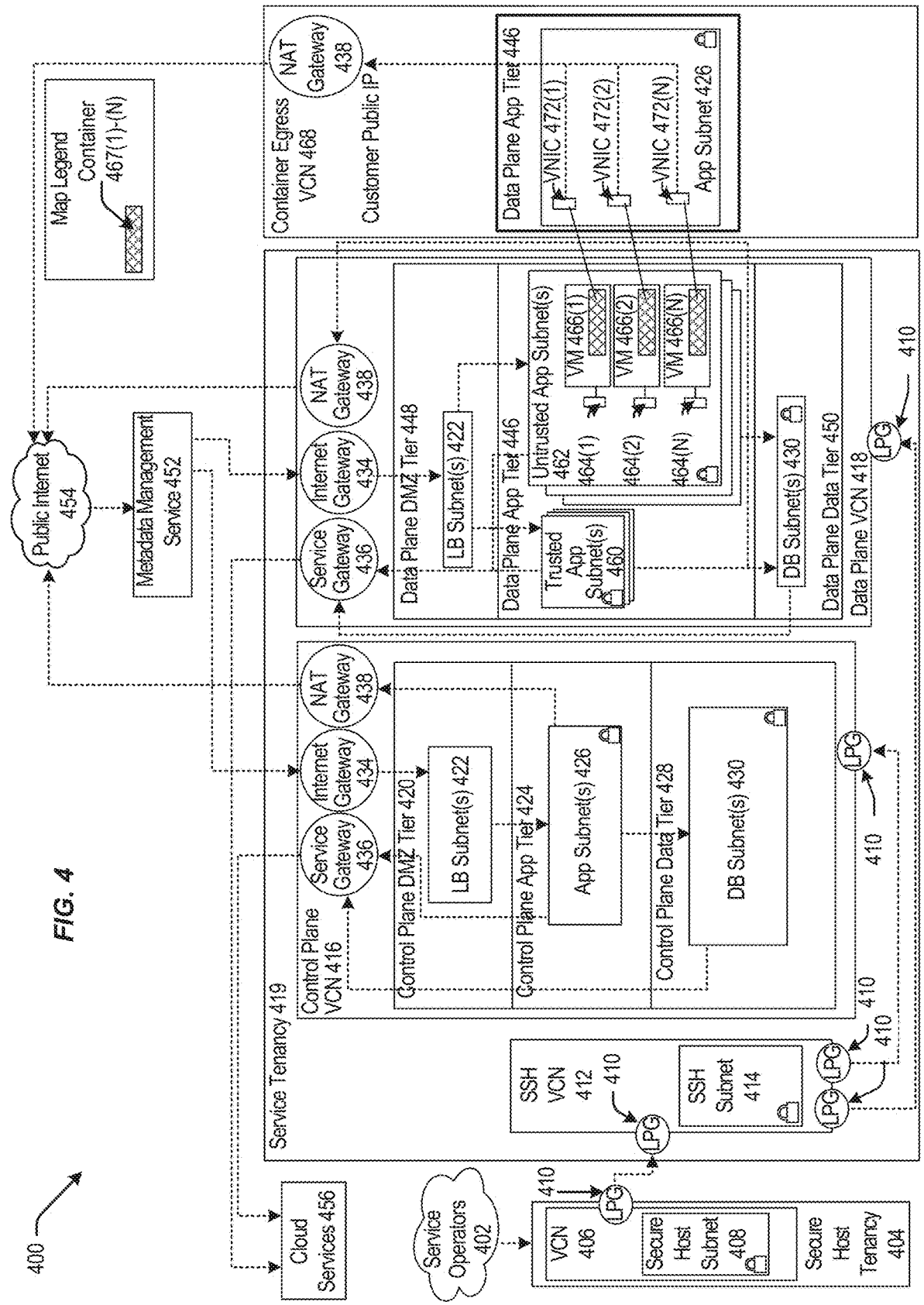

FIG. 4 is a block diagram illustrating another example pattern of an IaaS architecture 400 according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane VCN 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), and a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416, and the app subnet(s) 426 can be communicatively coupled to the DB subnet(s) 430 contained in the control plane data tier 428 and to a service gateway 436 (e.g., the service gateway of FIG. 1) and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Each tenant VM 466(1)-(N) can run code in a respective container 467(1)-(N) and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management service 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively couple to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider if the IaaS provider cannot directly communicate with the customer (e.g., a disconnected region). The respective containers 467(1)-(N) that are contained in the VMs 466(1)-(N) for each customer can be accessed in real-time by the customer. The containers 467(1)-(N) may be configured to make calls to respective secondary VNICs 472(1)-(N) contained in app subnet(s) 426 of the data plane app tier 446 that can be contained in the container egress VCN 468. The secondary VNICs 472(1)-(N) can transmit the calls to the NAT gateway 438 that may transmit the calls to public Internet 454. In this example, the containers 467(1)-(N) that can be accessed in real time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that request a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, and 400 may include components that are different and/or additional to the components shown in the figures. Further, the embodiments shown in the figures represent non-exhaustive examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as execution of a particular application and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally, or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network such as a physical network. Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process, such as a virtual machine, an application instance, or a thread. A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on one or more of the following: (a) the computing services requested by a particular client, (b) the aggregated computing services requested by a particular tenant, or (c) the aggregated computing services requested of the computer network. Such a computer network may be referred to as a "cloud network."

In an embodiment, a service provider provides a cloud network to one or more end users. Various service models may be implemented by the cloud network, including, but not limited to, Software-as-a-Service (SaaS), Platform-as-a-Service (PaaS), and Infrastructure-as-a-Service (IaaS). In SaaS, a service provider provides end users the capability to use the service provider's applications that are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including, but not limited to, a private cloud, a public cloud, and a hybrid cloud. In a private cloud, network resources are provisioned for exclusive use by a particular group of one or more entities; the term "entity" as used herein refers to a corporation, organization, person, or other entity. The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource when the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset when the tenant and the particular application, data structure, and/or dataset are associated with a same tenant ID.

As an example, each database implemented by a multi-tenant computer network may be tagged with a tenant ID. A tenant associated with the corresponding tenant ID may access data of a particular database. As another example, each entry in a database implemented by a multi-tenant computer network may be tagged with a tenant ID. A tenant associated with the corresponding tenant ID may access data of a particular entry. However, multiple tenants may share the database.

In an embodiment, a subscription list identifies a set of tenants, and, for each tenant, a set of applications that the tenant is authorized to access. For each application, a list of tenant IDs of tenants authorized to access the application is stored. A tenant is permitted access to a particular application when the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

Computer System

Figure 5:
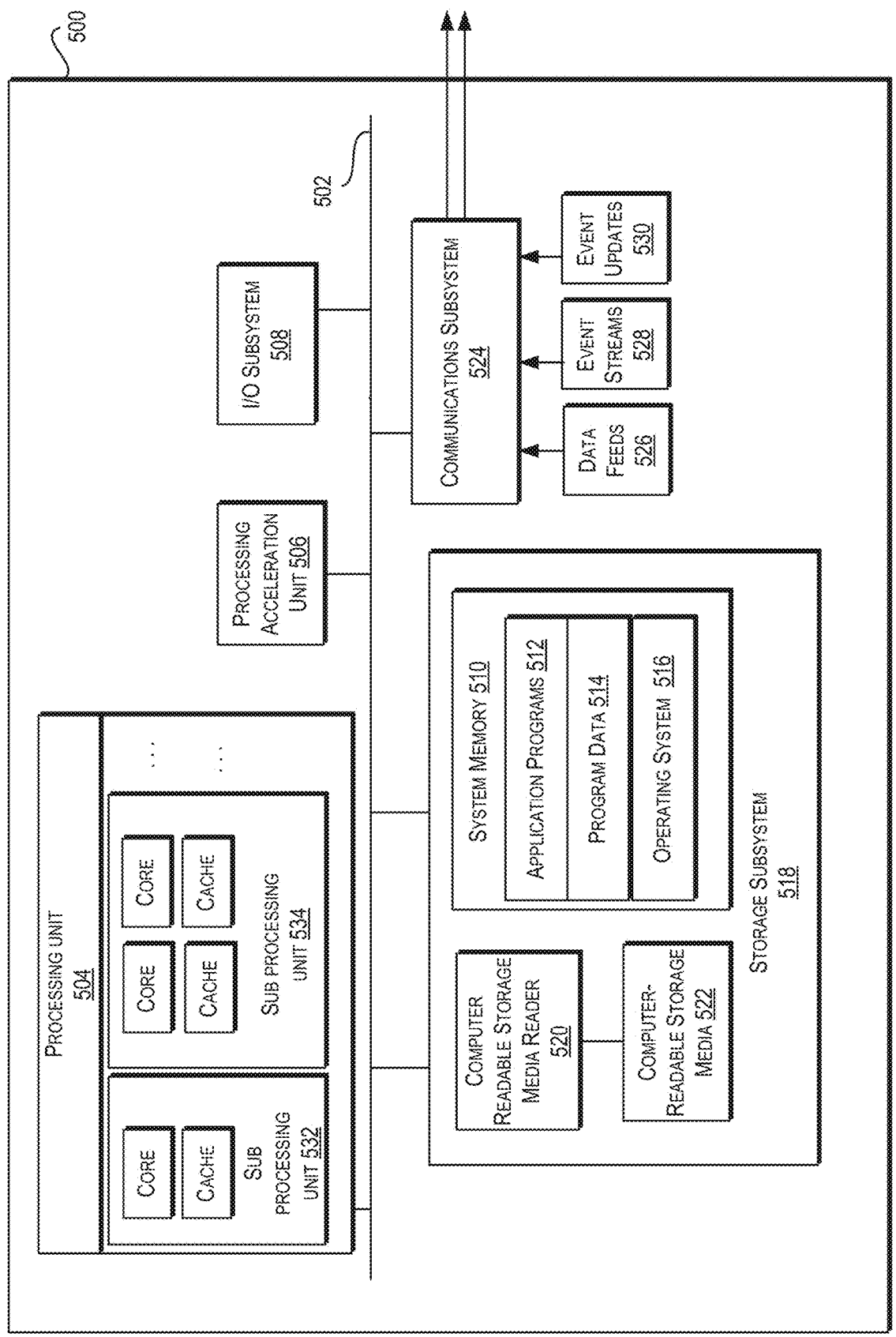
FIG. 5 is a hardware system in accordance with one or more embodiments.

FIG. 5 illustrates an example computer system 500. An embodiment of the disclosure may be implemented upon the computer system 500. As shown in FIG. 5, computer system 500 includes a processing unit 504 that communicates with peripheral subsystems via a bus subsystem 502. These peripheral subsystems may include a processing acceleration unit 506, an I/O subsystem 508, a storage subsystem 518, and a communications subsystem 524. Storage subsystem 518 includes tangible computer-readable storage media 522 and a system memory 510.

Bus subsystem 502 provides a mechanism for letting the various components and subsystems of computer system 500 to communicate with each other as intended. Although bus subsystem 502 is shown schematically as a single bus, alternative embodiments of the bus subsystem may utilize multiple buses. Bus subsystem 502 may be any of several types of bus structures, including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Additionally, such architectures may be implemented as a Mezzanine bus manufactured to the IEEE P1386.1 standard.

Processing unit 504 controls the operation of computer system 500. Processing unit 504 can be implemented as one or more integrated circuits (e.g., a conventional microprocessor or microcontroller). One or more processors may be included in processing unit 504. These processors may include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, the program code to be executed can be wholly or partially resident in processing unit 504 and/or in storage subsystem 518. Through suitable programming, processing unit 504 can provide various functionalities described above. Computer system 500 may additionally include a processing acceleration unit 506 that can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include medical imaging input devices such as computed tomography, magnetic resonance imaging, position emission tomography, or medical ultrasonography devices. User interface input devices may also include audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include any type of device and mechanism for outputting information from computer system 500 to a user or other computer. For example, user interface output devices may include, without limitation, a variety of display devices that visually convey text, graphics and audio/video information, such as monitors, printers, speakers, headphones, automotive navigation systems, plotters, voice output devices, and modems.

Computer system 500 may comprise a storage subsystem 518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 504 provide the functionality described above. Storage subsystem 518 may also provide a repository for storing data used in accordance with the present disclosure.

As depicted in the example in FIG. 5, storage subsystem 518 can include various components, including a system memory 510, computer-readable storage media 522, and a computer readable storage media reader 520. System memory 510 may store program instructions, such as application programs 512, that are loadable and executable by processing unit 504. System memory 510 may also store data, such as program data 514, that is used during the execution of the instructions and/or data that is generated during the execution of the program instructions. Various programs may be loaded into system memory 510 including, but not limited to, client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random access memory (RAM)) and/or non-volatile memory (such as read-only memory (ROM), flash memory, etc.). Different types of RAM configurations may be provided, including a static random access memory (SRAM), a dynamic random access memory (DRAM), and others. In some implementations, system memory 510 may include a basic input/output system (BIOS) containing basic routines that help to transfer information between elements within computer system 500 such as during start-up.

Computer-readable storage media 522 may represent remote, local, fixed, and/or removable storage devices plus storage media for temporarily and/or more permanently containing, storing, computer-readable information for use by computer system 500, including instructions executable by processing unit 504 of computer system 500.

Computer-readable storage media 522 can include any appropriate media known or used in the art, including storage media and communication media, such as but not limited to volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include solid-state drives (SSD) based on non-volatile memory, such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments, communications subsystem 524 can include radio frequency (RF) transceiver components to access wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments, communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services, such as Twitter® feeds, Facebook® updates, web feeds such as Rich Site Summary (RSS) feeds, and/or real-time updates from one or more third party information sources.

Additionally, communications subsystem 524 may be configured to receive data in the form of continuous data streams. The continuous data streams may include event streams 528 of real-time events and/or event updates 530 that may be continuous or unbounded in nature with no explicit end. Examples of applications that generate continuous data may include sensor data applications, financial tickers, network performance measuring tools (e.g., network monitoring and traffic management applications), click-stream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in FIG. 5 is intended as a non-limiting example. Many other configurations having more or fewer components than the system depicted in FIG. 5 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Data Ingestion System

Figure 6:
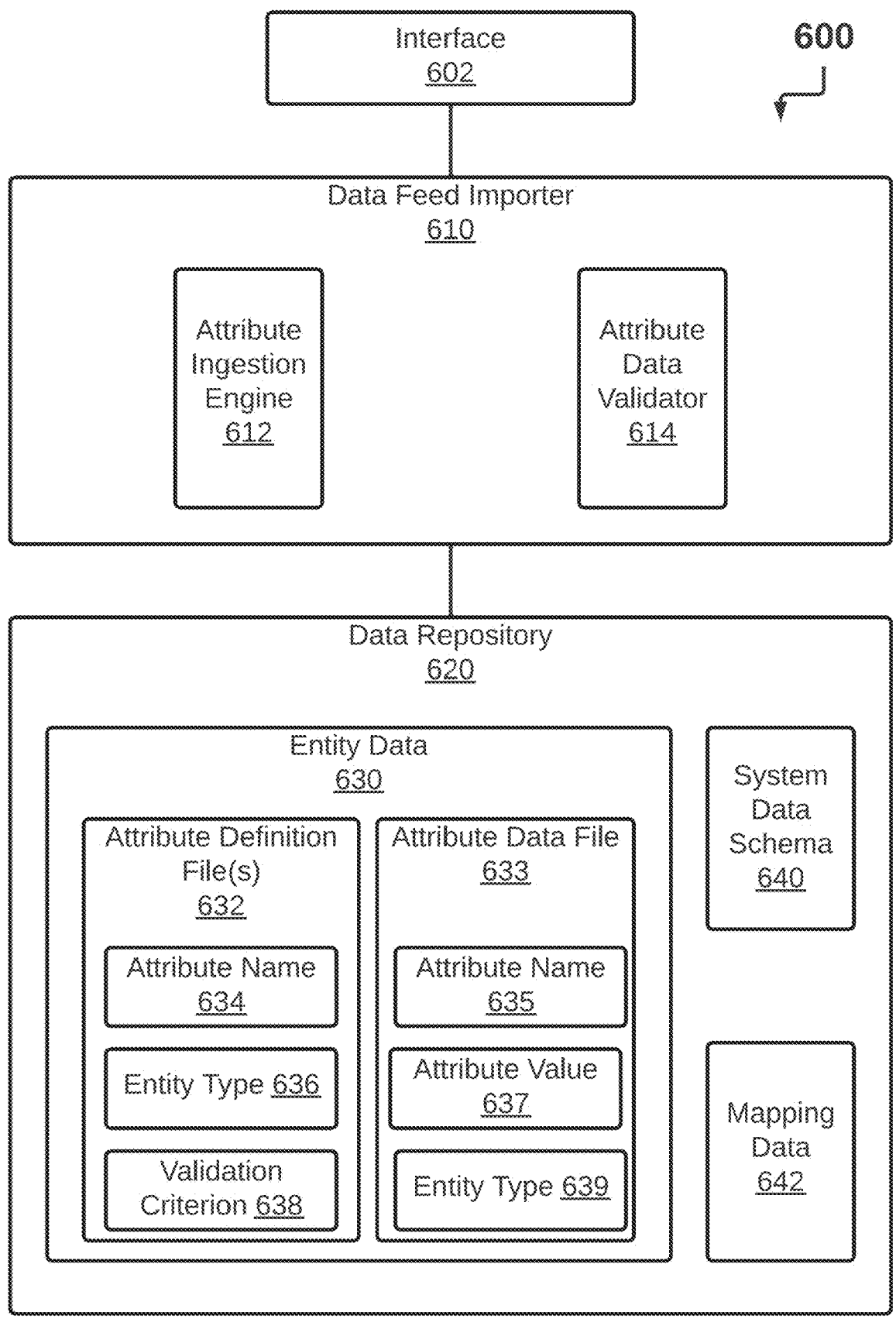
FIG. 6 illustrates a system in accordance with one or more embodiments.

FIG. 6 illustrates a system 600 in accordance with one or more embodiments. As illustrated in FIG. 6, system 600 includes an interface 602, a data feed importer 610, and a data repository 620. In one or more embodiments, the system 600 may include more or fewer components than the components illustrated in FIG. 6. The components illustrated in FIG. 6 may be local to or remote from each other. The components illustrated in FIG. 6 may be implemented in software and/or hardware. Each component may be distributed over multiple applications and/or machines. Multiple components may be combined into one application and/or machine. Operations described with respect to one component may instead be performed by another component.

In one or more embodiments, the data feed importer 610 refers to hardware and/or software configured to perform operations described herein for receiving, validating, and storing data from multiple clients regardless of format. The data feed importer 610 may include one or more functional components such as an attribute ingestion engine 612 and an attribute data validator 616. The data feed importer 610 may include more or fewer components than the illustrated components. Examples of operations for receiving, validating, and storing data are described below with reference to FIG. 7.

In one or more embodiments, the attribute ingestion engine 612 refers to hardware and/or software configured to perform operations described herein for receiving and importing an attribute definition file 632 from a client entity. The attribute ingestion engine 612 may receive an attribute definition file 632 and may store the attribute definition file in association with the entity that sent the file.

The attribute definition file 632 may include one or more attribute names 634, an entity type 636, and validation criteria 638. The entity type 636 may define the entity sending the attribute definition file 632 and/or the entity that an associated attribute data file 633 will be received from. Entity types may include, for example, a customer, e.g., a customer of a utility company; a utility company; or a third-party source of data. An attribute name 634 may be a string of alphanumeric characters that the entity uses to refer to a particular data attribute. For example, for a date of birth attribute, the attribute name could be "DOB", "birthdate", or "date of birth". Each attribute name may have one or more validation criteria associated with the name. The validation criteria may define the attribute's type of data, format of data, and/or allowed values. The validation criteria for a date of birth attribute name may specify that a value for the attribute must be in a defined date format, e.g., MM/DD/YYYY. The validation criteria may further specify limits on allowed date values, e.g., no dates in the future. The validation criteria for an attribute that is an enumerated type may include the specific values that the attribute is allowed to have. For a preferred language attribute, for example, the validation criteria may specify that values for the attribute are limited to "French", "English", "Spanish", and "Japanese". For an attribute that is a Boolean type, the validation criteria may limit the allowable values to "true" and "false", "yes" and "no", or "1" and "0". A number type attribute may have validation criteria that sets a range of allowed numbers.

The attribute definition file may be a text file, a spreadsheet, a table, or other file type that allows the parsing or extraction of an attribute name in association with an entity type and validation criteria. An attribute definition file may include, for example, an entry such as shown in Table 1.

TABLE 1

| Entity Type | Attribute Name | Validation Criteria |
| --- | --- | --- |
| CUSTOMER | Has_electric_vehicle | <BOOLEAN> |

An attribute definition file 632 may include one or more additional elements, such as a source identifier that indicates the source of the value, e.g., if the value comes from a corporate entity such as a utility company, or from a customer of the corporate entity. An attribute definition file 632 may include a field that describes an attribute, e.g., as a string. In the example above, the description for "has_electric_vehicle" may be "the customer has an electric vehicle". An attribute definition file 632 may include a value description, e.g., as a string. In the example above, the value description may be "Yes or true if the customer has an electric vehicle". An attribute definition file 632 may include one or more fields that may specify, for example, a minimum value, a maximum value, or a set of strings that are allowed to be used for an enumerated type.

In one or more embodiments, the attribute ingestion engine 612 is also configured to perform operations described herein for ingesting data from an attribute data file 633 from an entity. An attribute data file 633 may have one or more attribute names 635 and one or more attribute values 637 associated with the one or more attribute names. The attribute ingestion engine 612 may retrieve the attribute definition file 632 for the entity. The attribute ingestion engine 612 may determine whether the attribute name 635 is present in the attribute definition file 632 and whether the attribute value 637 associated with the attribute name 635 meets the validation criteria 638 for the attribute name. When the attribute name and associated value are both valid, the attribute ingestion engine 612 may store the attribute values 637 in the data repository 620. For example, the attribute ingestion engine 612 may store the attribute values 637 in a database defined by the system data schema 640, in a spreadsheet, a table, or any other data structure. The attribute ingestion engine 612 may determine whether the entity type 639 is present in the attribute definition file 632. The attribute ingestion engine 612 may determine whether a particular combination of attribute name 635 and entity type 639 is present in the attribute definition file 632.

An attribute data file 633 may include additional data related to an attribute name-value pair (not shown). For example, an attribute name-value pair may be associated with an entity identifier, such as a customer account number or other unique identifier. An attribute name-value pair may have an entry date/time that identifies when the value was assigned or a date and time when the attribute name-value pair will begin to be valid. An attribute name-value pair may have an end date/time that identifies when the value will no longer be valid. An attribute name-value pair may have a source identifier that indicates the source of the value, e.g., if the attribute name-value pair comes from a corporate entity such as a utility company, or from a customer of the corporate entity. In one or more embodiments, the system may use the source identifier and/or entry dates to resolve conflicting values for the same attribute name. For example, a value having a later entry date may be selected as likely more accurate than a value having an older entry date. Similarly, a value for a customer-related attribute name may be selected over a value for the same attribute name that came from a corporate entity.

The attribute data file may be a text file, a spreadsheet, a table, or other file type that associates an attribute name with a value and an entity type. The attribute ingestion engine 612 may read, parse, or otherwise extract data from the attribute data file. An attribute data file may include, for example, an entry such as shown in Table 2.

TABLE 2

| Entity Type | Attribute Name | Value | Entity_ID |
|---|---|---|---|
| CUSTOMER | Has_electric_vehicle | TRUE | 132xyz |

The attribute ingestion engine 612 may receive the attribute definition file 632 and the attribute data file 633 at the same time. The attribute ingestion engine 612 may store the attribute definition file 632 such that the file 632 is immediately available for ingesting the concurrently received attribute data file 633. The attribute ingestion engine 612 may receive the attribute definition file 632 first and may store the file 632 such that the file 632 is available to use for ingesting any subsequently received attribute data file 633.

In one or more embodiments, the attribute data validator 616 refers to hardware and/or software configured to perform operations described herein for mapping an attribute name 635 from an attribute data file 633 to an attribute name 634 in an attribute definition file 632 to obtain the validation criteria 638 for the attribute name 634. The attribute data validator 616 may then use the validation criteria 638 to determine whether the attribute value 637 is in a valid format.

In one or more embodiments, the system 600 may include mapping data 642 that can include associations between an attribute name 634 and an attribute name in the system data schema 640. For example, the mapping data 642 may include an entry that maps an attribute name 634 of "DOB" to an internal attribute name "date of birth" in the data schema 640. The mapping data 642 may also include, for an attribute name mapping, additional entries that map how values for the attribute name may map to internal values. For example, for a Boolean-type attribute, the validation criteria 638 may specify that the values can be "T" and "F", while the values in the system data schema 640 for the related internal attribute name are "true" and "false". The mapping data 642 may allow stored attribute values to be retrieved using either version of an attribute name: the name 634 or the name in the system data schema 640.

The system data schema 640 may define a database storage structure that can store any data attributes that have a name-value structure. The system data schema 640, may for example, include an attribute name table that includes all of the attribute names received from attribute definition files. The attribute name table may also include, for each attribute name, a link to a separate structure that stores received values for that particular attribute. When a new attribute name is received, the new attribute name may be added to that attribute name table and a new separate structure for storing the values for that attribute name and other related information may be generated and linked to the attribute name table. This allows the data repository to be extended for any new attribute types having the name-value structure without needing any revisions to the data schema.

In one or more embodiments, a data repository 620 is any type of storage unit and/or device (e.g., a file system, database, collection of tables, or any other storage mechanism) for storing data. Further, a data repository 620 may include multiple different storage units and/or devices. The multiple different storage units and/or devices may or may not be of the same type or located at the same physical site. Further, a data repository 620 may be implemented or executed on the same computing system as the data feed importer 610. Alternatively, or additionally, a data repository 620 may be implemented or executed on a computing system separate from the data feed importer 610. The data repository 620 may be communicatively coupled to the data feed importer 610 via a direct connection or via a network.

Information describing entity data 630, the system data schema 640 and the mapping data 642 may be implemented across any of components within the system 600. However, this information is illustrated within the data repository 620 for purposes of clarity and explanation.

In an embodiment, the system 600 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

Additional embodiments and/or examples relating to computer networks are described below in Section 5, titled "Computer Networks and Cloud Networks."

In one or more embodiments, interface 602 refers to hardware and/or software configured to facilitate communications between a user and the data feed importer 610. Interface 602 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 602 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 602 is specified in one or more other languages, such as Java, C, or C++.

Receiving, Validating, and Storing Data

Figure 7:
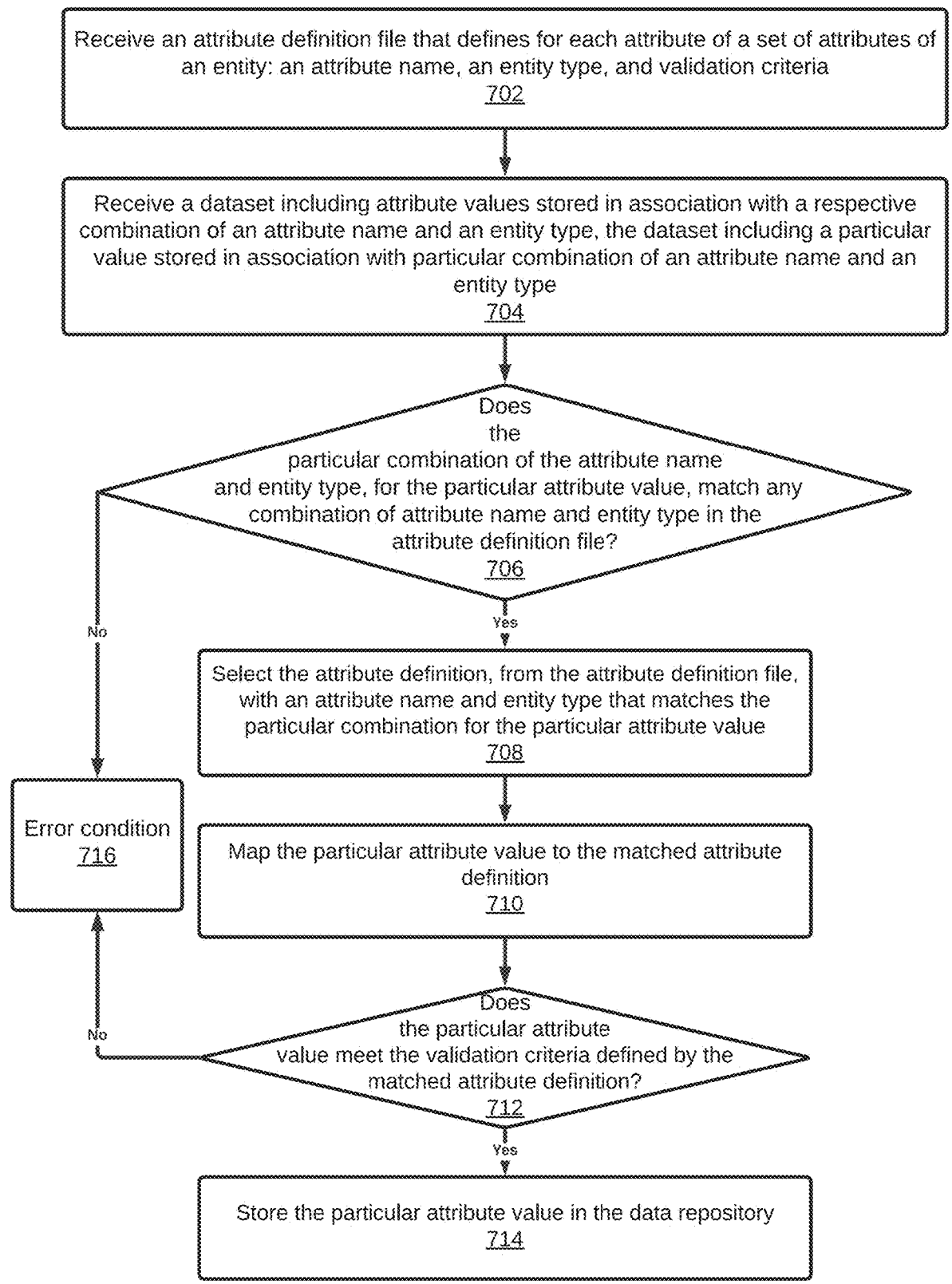
FIG. 7 illustrates an example set of operations for receiving, validating, and storing data in accordance with one or more embodiments.

FIG. 7 illustrates an example set of operations for receiving, validating, and storing data in accordance with one or more embodiments. One or more operations illustrated in FIG. 7 may be modified, rearranged, or omitted all together. Accordingly, the particular sequence of operations illustrated in FIG. 7 should not be construed as limiting the scope of one or more embodiments.

One or more embodiments receive an attribute definition file that defines for each attribute of a set of attributes of an entity: an attribute name, an entity type, and validation criteria (Operation 702). The system may receive the attribute definition file via an upload through a website or directly into a file directory at the cloud service provider. The system may receive the attribute definition file through a secure SSH connection. The system may receive the attribute definition file in an email message. In some cases, the attribute definition file may be transmitted to the system automatically when the attribute definition file is modified by the sending entity, or when a new attribute definition file is created and stored by the sending entity. For example, the system may receive, from a corporate entity, an attribute definition file that includes one or more attribute names and validation criteria, with an entity type, e.g., "corporate entity". The system may parse the attribute definition file to identify each pairing of the attribute names and validation criteria. The system may store each combination of attribute name, validation criteria, and entity type in a data repository. Additionally, or alternatively, the system may store the attribute definition file in the data repository.

In one or more embodiments, the system receives a dataset with attribute values stored in association with a respective combination of an attribute name and an entity type (Operation 704). The system may receive the dataset via an upload through a website or directly into a file directory at the cloud service provider. The system may receive the dataset through a secure SSH connection. The system may receive the dataset in an email message. In some cases, the dataset may be transmitted to the system automatically when the dataset is created and/or modified and stored by the sending entity. The dataset includes a particular value stored in association with a particular combination of an attribute name and an entity type. For example, the system may receive an attribute data file from an entity, such as a corporate entity, a customer of the corporate entity, or a third-party source of data.

In one or more embodiments, the system determines whether the particular combination of the attribute name and entity type, for the particular attribute value, matches any combination of attribute name and entity type in the attribute definition file (Operation 706). For example, the system may extract the attribute name "has_electric_vehicle" and the entity type "customer" from the attribute data file and may determine whether the attribute definition file provided by the same entity that provided the attribute data file includes an attribute name of "has_electric_vehicle" for an entity type "customer". The system may compare strings for the attribute name and entity type in the dataset to the strings in the attribute definition file. In some cases, the system may compare the strings concurrently. In other cases, the system may compare one set of strings first, e.g., the entity name strings, and may compare the other set of strings, e.g., the attribute name strings, when a match is found for the first set. The system may query the attribute definition file with the attribute name and entity type from the dataset. If the attribute name and entity type are found in the attribute definition file, the attribute definition may be returned as the reply to the query. If either of the attribute name and entity type are not found, an error condition may occur.

If the attribute name and entity type pair does not match any combination of attribute name and entity type in the attribute definition file, system may raise an error condition (Operation 716). For example, the system may alert the entity associated with the data source. The alert may be sent as a message to the sending entity and/or to a user at the cloud service. The message may, for example, be an email message or a text message. The message may cause software at the sender and/or at the cloud provider to display a GUI message indicating the error. The alert may indicate that the attribute data file contains data not defined by the attribute definition file. This may prompt the sending entity to revise their attribute definition file to include the attribute name, or to correct their attribute data file, for example, if an attribute name is misspelled.

In an embodiment, the system selects an attribute definition, from the attribute definition file, with an attribute name and entity type that matches the particular combination for the particular attribute value (Operation 708). The attribute definition is selected in response to determining that the particular combination of the attribute name and entity type, for the particular attribute value, matches a combination of attribute name and entity type in the attribute definition file.

In one or more embodiments, the system maps the particular attribute value to the matched attribute definition (Operation 710). Mapping the particular attribute value to the matched attribute definitions includes selecting the matched attribute definition for validating the particular attribute value.

In one or more embodiments, the system determines whether the particular attribute value meets the validation criteria defined by the selected attribute definition (Operation 712). In the above example, the system may determine whether the "TRUE" value for "has_electric_vehicle" is a Boolean value. For an enumerated type, the system determines if the string received in the attribute data file matches any of the permitted values from the attribute definition file.

If the particular attribute value does not meet the validation criteria defined by the selected attribute definition, the system may raise an error condition (Operation 716). The error condition may be an alert sent as a message to the sending entity and/or to a user at the cloud service. The message may, for example, be an email message or a text message. The message may cause software at the sender and/or at the cloud provider to display a GUI message indicating the error. For example, the system may notify the entity that provided the attribute data file and the attribute definition file that the data in the attribute data file is not valid according to the attribute definition file.

One or more embodiments store the particular attribute value in the data repository (Operation 714). The system stores the particular attribute value in the data repository in response to determining that the particular attribute value meets the validation criteria defined by the matched attribute definition. Storing the value may include storing the attribute-value pair as received in the attribute data file. Alternatively, or additionally, storing the value may include mapping the attribute, as received in the attribute data file, to a known attribute associated with a data repository. The value, from the attribute-value pair, is stored in data repository in association with the known attribute-value pair.

In one or more embodiments, the system uses mapping data to associate data for an attribute name with a system-internal attribute name as used by the system data schema. For example, if the attribute name "has_electric_vehicle" is mapped to a system-internal attribute name of "has_EV", then the system may store the data shown above in Table 7 in association with the system-internal attribute name of "has_EV" while also retaining the attribute name "has_electric_vehicle". A mapping may also include system-internal values. For example, a mapping entry that maps "has_electric_vehicle" to "has_EV" may also map a value of "TRUE" to a system-internal value of "Yes". The system may store each attribute name-value pair in a data repository defined by the system data schema. This may allow the cloud service provider to retrieve data from the data repository using either the system-internal attribute names or the entity provided attribute names.

Prior to receiving any attribute definition file and attribute data file, the cloud service provider may provide a specification to the client entity that describes the expected format for the respective files. When an entity wants to modify their data feed to the cloud provider, for: example, by adding a new attribute, in one or more embodiments, the entity may provide a new attribute definition file that includes, for example, the definition for a new attribute without the definitions for any previously defined attributes. Alternatively, the entity may provide a new definition file that includes the contents of their previous definition file and any additional definitions. Similarly, if the entity wishes to modify an existing attribute, the entity may provide a new attribute definition file that includes, for example, the new, modified, definition for the existing attribute without the definitions for any previously defined attributes. Alternatively, the entity may provide a new definition file that includes the contents of their previous definition file and the modification(s) to the existing attribute. In any case, the new definition file may be ingested as described above. Duplicate definition entries may be ignored or may overwrite the older duplicate definition entry.

Example Embodiment

Figure 8:
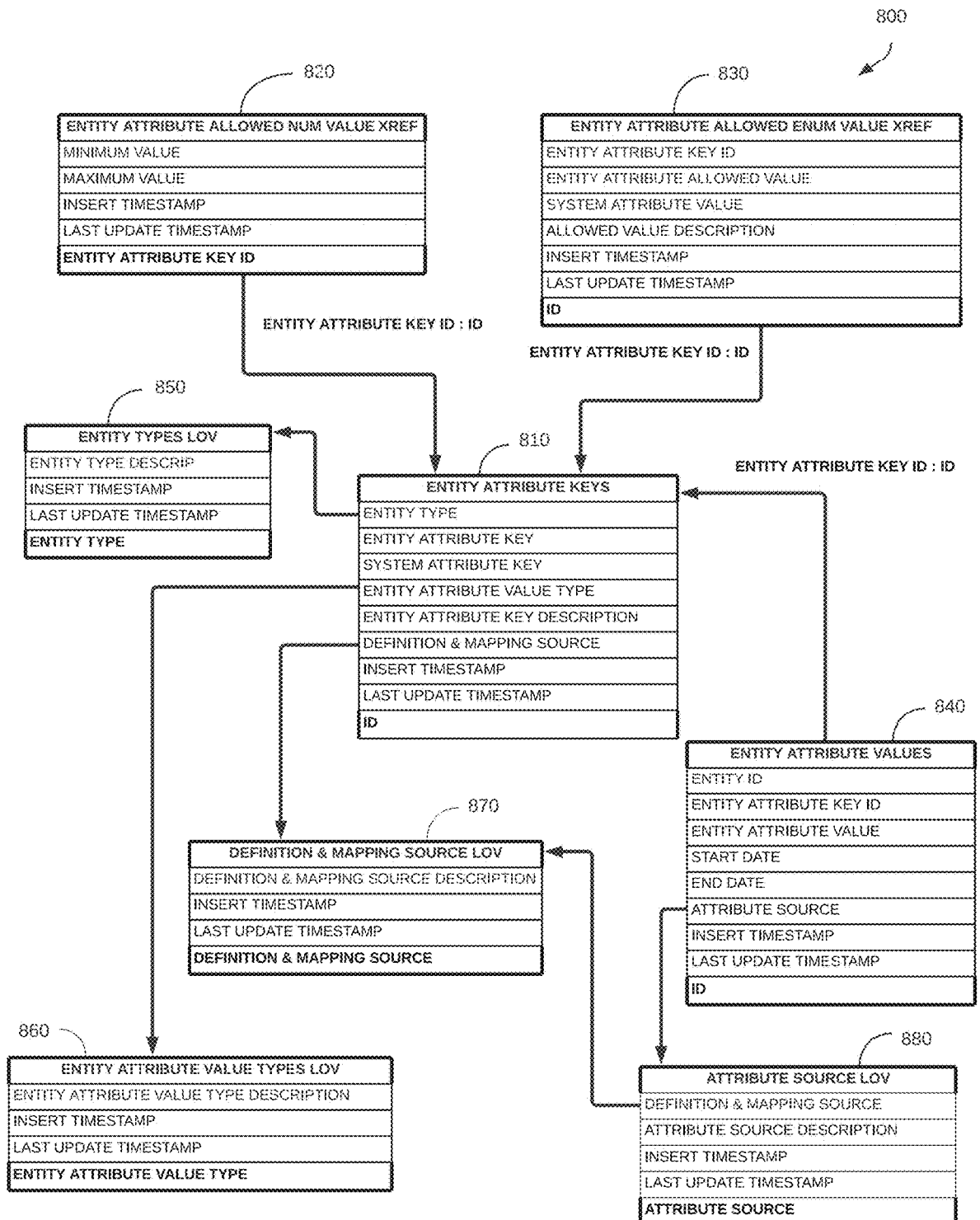
FIG. 8 illustrates an example of a database schema in accordance with one or more embodiments.

FIG. 8 illustrates an example of a logical database schema 800 in accordance with one or more embodiments. The schema 800 supports the ingestion of data from multiple different entities in conjunction with attribute definition files that are specific to the individual entities.

Schema 800 includes a plurality of relationally connected tables: 810, 820, 830, 840, 850, 860, 870, and 880. A given table defines the fields of a database structure and includes a name and a primary key. As illustrated, the name of the database structure is in the top row and the primary key is in the bottom row. For example, the name of table 810 is "Entity Attribute Keys" and the primary key of table 810 is "ID". A primary key may be a numeric or alphanumeric sequence that uniquely identifies a database record in the database structure.

Table 810 includes a field for an entity type. The entity type field may include a numeric or alphanumeric identifier that identifies a type of entity. The entity type value is a foreign key that links the entity type field to the entity type list of values (LOV) table 850. The foreign key in the table 810 corresponds to a primary key in the table 850. An entity type may refer to a category of customer entity, such as a public utility, a private utility, a government agency, an educational entity, or a commercial business entity.

Table 810 includes a field for an entity attribute key and a field for a system attribute key. The entity attribute key may be an alphanumeric name of an attribute used by the entity and included in the attribute definition file from the entity, e.g., "has_electric_vehicle". The system attribute key may be an alphanumeric name of the system's version of the same attribute, e.g., "has_EV".

Table 810 includes a field for an entity attribute value type. The entity attribute value type is a foreign key that links the entity attribute value type field to the entity attribute value types LOV table 860. An entity attribute value type may indicate that the entity attribute is, for example, a number, a date, or a string.

Table 810 includes a field for an entity attribute key description. The entity attribute key description may be a text description of the attribute to help human operators understand what the attribute refers to.

Table 810 includes a field for a mapping and definition source. The mapping and definition source is a foreign key that links to the definition and mapping LOV table 870. The mapping and definition source may be a file name or file path name for the location of the attribute definition file that was the source for the entity attribute in the record.

The schema 800 includes cross reference tables 820 and 830. A cross reference (XREF) table enables the mapping between a system attribute and an entity attribute. Table 820 includes a field for a minimum numeric value that an entity attribute can have and a field for a maximum numeric value that the entity attribute can have. For example, for an entity attribute of a day (in a date), the minimum value is "1" and the maximum value is "31".

Table 830 defines a field for the values allowed for an enumerated type ("entity attribute allowed value") and a field for the values of the related system attribute type ("system attribute value").

The entity attribute values table 840 defines a database record that stores attribute values of an entity's attributes. The record includes a field for the entity ID, identifying the specific entity that supplied the value. The record includes a field for the entity attribute key ID. The entity attribute key ID is a foreign key that links the record to the tables 820 and 830, via the table 810. The entity attribute value field holds the specific value of the attribute. The record also includes a field for a foreign key linking to the attribute source LOV table 880. The record may include a field for a start date, indicating when the value was assigned or when the value will be valid. The record may include a field for an end date, indicating when the value will no longer be valid.

The tables in the schema may also have fields to hold timestamp data. For example, the tables may include an "insert timestamp" field that indicates when the record was created and added to the data store. The tables may include a "last update timestamp" field that indicates the date and time when information in the database record was updated.

Practical Applications, Advantages, and Improvements

A cloud service that receives data from multiple clients and provides services based on that data conventionally may have different data formats and different file formats from each different client, making data storage and aggregation time consuming and not extendable. A given client may be limited to providing data of a limited set of types. If a client wishes to add a new type of data or wishes to modify an existing type of data, conventionally, a new data schema may need to be developed. This may cause delays in ingesting client data and in providing services based on that data.

The disclosed embodiments allow clients of the cloud service to easily add to or modify their data feeds to the cloud service simply by providing an updated or additional attribute definition file. Any concurrent or subsequent attribute data files received are validated against the attribute definition file and can be added immediately to the data repository.

Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner that might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions that, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of patent protection, and what is intended by the applicants to be the scope of patent protection, is the literal and equivalent scope of the set of claims that issue from this application, in the specific form in that such claims issue, including any subsequent correction.

What is claimed is:

1. One or more non-transitory computer-readable media storing program instructions that, when executed by one or more hardware processors, cause performance of operations comprising:
    configuring, by a database application for a particular data repository, an adaptive data intake process that allows for intake and validation of datasets corresponding to database schemas that are different from internal database schemas associated with the particular data repository, wherein the particular data repository is associated with a target database schema that defines at least a target entity type, a target attribute corresponding to the target entity type, and a target attribute validation criteria associated with the target attribute, wherein configuring the adaptive data intake process includes:
    receiving an attribute definition file, comprising a first plurality of attribute definitions for a respective first plurality of attributes corresponding to a first entity type, the first plurality of attribute definitions comprising a first attribute definition for a first attribute of the first plurality of attributes, the first attribute corresponding to a first entity type,
    wherein the first attribute definition comprises a first combination of: (a) a first attribute name, (b) the first entity type and (c) a first attribute validation criteria for validating data values corresponding to the first attribute;
    based on the attribute definition file: generating and storing a mapping of the first attribute, of the first entity type, to the target attribute of the target entity type, wherein the first attribute name corresponding to the first attribute is different from a target attribute name corresponding the target attribute and/or the target attribute validation criteria corresponding to the first attribute is different from the target validation criteria corresponding to the target attribute;

executing, by the database application, the adaptive data intake process for ingesting a dataset into the particular data repository, wherein the dataset is associated with a different database schema than the target database schema associated with the particular data repository, wherein executing the adaptive data intake process includes:
  receiving the dataset comprising a plurality of attribute values with a respective plurality of attribute names, wherein the plurality of attribute values comprise a first attribute value stored in association with a second attribute name;
  responsive at least to determining that the second attribute name, in the dataset, maps to the first attribute name in the attribute definition file: mapping the first attribute value to the first attribute definition;
  responsive to mapping the first attribute value to the first attribute definition, determining whether the first attribute value meets the first attribute validation criteria of the first attribute definition; and
  responsive to determining that the first attribute value meets the first attribute validation criteria and based on the mapping of the first attribute to the target attribute: storing the first attribute value in the particular data repository in association with the target attribute.

2. The non-transitory computer-readable media of claim 1, wherein the attribute definition file and the dataset are concurrently received, and wherein the operations include ingesting the dataset into the particular data repository based on the attribute definition file without changing any schemas associated with the particular data repository.

3. The non-transitory computer-readable media of claim 1, wherein storing the first attribute value in the particular data repository comprises storing a row, in a table in the particular data repository, comprising the first attribute value, an identifier corresponding to the first attribute value, and a second attribute name corresponding to the first attribute value, wherein the second attribute name is (a) identical to the first attribute name and/or (b) mapped to the first attribute name.

4. The non-transitory computer-readable media of claim 1, wherein the first attribute validation criteria identifies a particular type corresponding to the first attribute, and wherein determining that the first attribute value meets the first attribute validation criteria comprises determining the first attribute value is of the particular type.

5. The non-transitory computer-readable media of claim 1, wherein the first attribute validation criteria enumerates a set of potential values for the first attribute, and wherein determining that the first attribute value meets the first attribute validation criteria comprises determining the first attribute value matches one of the enumerated sets of potential values.

6. The non-transitory computer-readable media of claim 1, wherein receiving the dataset comprising the plurality of attribute values comprises receiving a table, wherein each of the plurality of attribute values corresponds to a respective row in the table.

7. The non-transitory computer-readable media of claim 1, wherein mapping the first attribute value to the first attribute definition is further responsive to determining that a second entity type stored in the dataset, in association with the first attribute value, maps to the first entity type comprised in the first attribute definition.

8. The non-transitory computer-readable media of claim 1, wherein the operations further comprise:
  receiving user input mapping the second attribute name to the first attribute name; and
  storing a relationship between the second attribute name and the first attribute name;
  wherein the second attribute name was determined to be mapped to the first attribute name based on the stored relationship.

9. A method comprising:
configuring, by a database application for a particular data repository, an adaptive data intake process that allows for intake and validation of datasets corresponding to database schemas that are different from internal database schemas associated with the particular data repository, wherein the particular data repository is associated with a target database schema that defines at least a target entity type, a target attribute corresponding to the target entity type, and a target attribute validation criteria associated with the target attribute, wherein configuring the adaptive data intake process includes:
  receiving an attribute definition file, comprising a first plurality of attribute definitions for a respective first plurality of attributes corresponding to a first entity type, the first plurality of attribute definitions comprising a first attribute definition for a first attribute of the first plurality of attributes, the first attribute corresponding to a first entity type,
  wherein the first attribute definition comprises a first combination of: (a) a first attribute name, (b) the first entity type and (c) a first attribute validation criteria for validating data values corresponding to the first attribute;
  based on the attribute definition file: generating and storing a mapping of the first attribute, of the first entity type, to the target attribute of the target entity type, wherein the first attribute name corresponding to the first attribute is different from a target attribute name corresponding the target attribute and/or the target attribute validation criteria corresponding to the first attribute is different from the target validation criteria corresponding to the target attribute;
executing, by the database application, the adaptive data intake process for ingesting a dataset into the particular data repository, wherein the dataset is associated with a different database schema than the target database schema associated with the particular data repository, wherein executing the adaptive data intake process includes:
  receiving the dataset comprising a plurality of attribute values with a respective plurality of attribute names, wherein the plurality of attribute values comprise a first attribute value stored in association with a second attribute name;
  responsive at least to determining that the second attribute name, in the dataset, maps to the first attribute name in the attribute definition file: mapping the first attribute value to the first attribute definition;
  responsive to mapping the first attribute value to the first attribute definition, determining whether the first attribute value meets the first attribute validation criteria of the first attribute definition; and
responsive to determining that the first attribute value meets the first attribute validation criteria and based on the mapping of the first attribute to the target attribute: storing the first attribute value in the particular data repository in association with the target attribute;

wherein the method is performed by at least one device including a hardware processor.

10. The method of claim 9, wherein the attribute definition file and the dataset are concurrently received, wherein the method further comprises ingesting the dataset into the particular data repository based on the attribute definition file without changing any schemas associated with the particular data repository.

11. The method of claim 9, wherein storing the first attribute value in the particular data repository comprises storing a row, in a table in the particular data repository, comprising the first attribute value, an identifier corresponding to the first attribute value, and a second attribute name corresponding to the first attribute value, wherein the second attribute name is (a) identical to the first attribute name and/or (b) mapped to the first attribute name.

12. The method of claim 9, wherein the first attribute validation criteria identifies a particular type corresponding to the first attribute, and wherein determining that the first attribute value meets the first attribute validation criteria comprises determining the first attribute value is of the particular type.

13. The method of claim 9, wherein the first attribute validation criteria enumerates a set of potential values for the first attribute, and wherein determining that the first attribute value meets the first attribute validation criteria comprises determining the first attribute value matches one of the enumerated sets of potential values.

14. The method of claim 9, wherein receiving the dataset comprising the plurality of attribute values comprises receiving a table, wherein each of the plurality of attribute values corresponds to a respective row in the table.

15. The method of claim 9, wherein mapping the first attribute value to the first attribute definition is further responsive to determining that a second entity type stored in the dataset, in association with the first attribute value, maps to the first entity type comprised in the first attribute definition.

16. The method of claim 9, further comprising:
receiving user input mapping the second attribute name to the first attribute name; and
storing a relationship between the second attribute name and the first attribute name;
wherein the second attribute name was determined to be mapped to the first attribute name based on the stored relationship.

17. A system comprising:
one or more hardware processors;
one or more non-transitory computer-readable media; and
program instructions stored on the one or more non-transitory computer-readable media that, when executed by the one or more hardware processors, cause the system to perform operations comprising:
configuring, by a database application for a particular data repository, an adaptive data intake process that allows for intake and validation of datasets corresponding to database schemas that are different from internal database schemas associated with the particular data repository, wherein the particular data repository is associated with a target database schema that defines at least a target entity type, a target attribute corresponding to the target entity type, and a target attribute validation criteria associated with the target attribute, wherein configuring the adaptive data intake process includes:
receiving an attribute definition file, comprising a first plurality of attribute definitions for a respective first plurality of attributes corresponding to a first entity type, the first plurality of attribute definitions comprising a first attribute definition for a first attribute of the first plurality of attributes, the first attribute corresponding to a first entity type,
wherein the first attribute definition comprises a first combination of: (a) a first attribute name, (b) the first entity type and (c) a first attribute validation criteria for validating data values corresponding to the first attribute;
based on the attribute definition file: generating and storing a mapping of the first attribute, of the first entity type, to the target attribute of the target entity type, wherein the first attribute name corresponding to the first attribute is different from a target attribute name corresponding the target attribute and/or the target attribute validation criteria corresponding to the first attribute is different from the target validation criteria corresponding to the target attribute;
executing, by the database application, the adaptive data intake process for ingesting a dataset into the particular data repository, wherein the dataset is associated with a different database schema than the target database schema associated with the particular data repository, wherein executing the adaptive data intake process includes:
receiving the dataset comprising a plurality of attribute values with a respective plurality of attribute names, wherein the plurality of attribute values comprise a first attribute value stored in association with a second attribute name;
responsive at least to determining that the second attribute name, in the dataset, maps to the first attribute name in the attribute definition file: mapping the first attribute value to the first attribute definition;
responsive to mapping the first attribute value to the first attribute definition, determining whether the first attribute value meets the first attribute validation criteria of the first attribute definition; and
responsive to determining that the first attribute value meets the first attribute validation criteria and based on the mapping of the first attribute to the target attribute: storing the first attribute value in the particular data repository in association with the target attribute.

18. The system of claim 17, wherein the attribute definition file and the dataset are concurrently received, and wherein the operations include ingesting the dataset into the particular data repository based on the attribute definition file without changing any schemas associated with the particular data repository.

19. The system of claim 17, wherein mapping the first attribute value to the first attribute definition is further responsive to determining that a second entity type stored in the dataset, in association with the first attribute value, maps to the first entity type comprised in the first attribute definition.

20. The system of claim 17, wherein the operations further comprise:
receiving user input mapping the second attribute name to the first attribute name; and
storing a relationship between the second attribute name and the first attribute name;
wherein the second attribute name was determined to be mapped to the first attribute name based on the stored relationship.

21. The method of claim 9, wherein the target database schema comprises an attribute name table configured to include a plurality of attribute names received in one or more attribute definition files, and wherein, for a given attribute name in the attribute name table, the particular data repository includes a separate data structure, linked to the attribute name, for storing values received for the given attribute name;

wherein the method further comprises:
receiving a new attribute name in a new attribute definition file or an updated attribute definition file;
adding the new attribute name to the attribute name table; and
creating a new separate data structure linked to the new attribute name for storing values received for the new attribute name.

22. The method of claim 9, further comprising:
receiving a request to retrieve an attribute value corresponding to the first attribute, the request including the first attribute name; and
based on the mapping of the first attribute to the target attribute, retrieving the requested attribute value stored in association with the target attribute.

23. The method of claim 9, further comprising:
receiving a second attribute definition file, comprising a second plurality of attribute definitions for a respective second plurality of attributes corresponding to a second entity type, the second plurality of attribute definitions comprising a second attribute definition for a second attribute of the second plurality of attributes, the second attribute corresponding to a second entity type,
wherein the second attribute definition comprises a second combination of: (a) a second attribute name, (b) the second entity type—and (c) a second attribute validation criteria for validating data values corresponding to the second attribute;
based on the attribute definition file: generating and storing a mapping of the second attribute, of the second entity type, to the target attribute of the target entity type, wherein the second attribute name corresponding to the second attribute is different from the target attribute name corresponding the target attribute and/or the target attribute validation criteria corresponding to the second attribute is different from the target validation criteria corresponding to the target attribute;
executing, by the database application, the adaptive data intake process for ingesting a second dataset into the particular data repository, wherein the second dataset is associated with a different database schema than the target database schema associated with the particular data repository, wherein executing the adaptive data intake process includes:
receiving the second dataset comprising a plurality of attribute values with a respective plurality of attribute names, wherein the plurality of attribute values comprise a second attribute value stored in association with a third attribute name;
responsive at least to determining that the third attribute name, in the dataset, maps to the second attribute name in the second attribute definition file: mapping the second attribute value to the second attribute definition;
responsive to mapping the second attribute value to second first attribute definition, determining whether the second attribute value meets the second attribute validation criteria of the second attribute definition; and
responsive to determining that the second attribute value meets the second attribute validation criteria and based on the mapping of the second attribute to the target attribute: storing the second attribute value in the particular data repository in association with the target attribute.

24. The method of claim 23, wherein the second attribute name is different from the first attribute name and/or the second attribute validation criteria is different from the first attribute validation criteria.

* * * * *